United States Patent
Ekeland et al.

(10) Patent No.: US 7,563,515 B2
(45) Date of Patent: Jul. 21, 2009

(54) SILICONE COMPOSITIONS AND THEIR USE IN CONTROLLING THE RELEASE OR TRANSFER OF PRINTED OR MOLDED PATTERNS AND TRANSFERRING PROCESSES THEREFORE

(75) Inventors: Robert Ekeland, Midland, MI (US); Dimitris Katsoulis, Midland, MI (US); Bizhong Zhu, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 289 days.

(21) Appl. No.: 10/581,765

(22) PCT Filed: Oct. 22, 2004

(86) PCT No.: PCT/US2004/035251

§ 371 (c)(1), (2), (4) Date: Jun. 6, 2006

(87) PCT Pub. No.: WO2005/068569

PCT Pub. Date: Jul. 28, 2005

(65) Prior Publication Data

US 2007/0020468 A1 Jan. 25, 2007

Related U.S. Application Data

(60) Provisional application No. 60/531,759, filed on Dec. 22, 2003.

(51) Int. Cl.
*B32B 9/04* (2006.01)
(52) U.S. Cl. ............................ 428/447; 528/15; 528/32; 528/33; 525/477; 525/478; 428/478
(58) Field of Classification Search .......... 428/447–478; 528/15, 32–33; 525/477–478
See application file for complete search history.

(56) References Cited

U.S. PATENT DOCUMENTS

| 5,013,772 | A  | * | 5/1991  | Fujiki et al. ................. 523/213 |
| 6,280,552 | B1 |   | 8/2001  | Bottari |
| 6,509,423 | B1 | * | 1/2003  | Zhu ............................ 525/478 |
| 6,660,395 | B2 | * | 12/2003 | McGarry et al. ............ 428/447 |
| 6,805,809 | B2 | * | 10/2004 | Nuzzo et al. ................. 216/54 |

OTHER PUBLICATIONS

"Decal Transfer Microlithogrpahy: A new soft-lithographic patterning method," Childs, William R., Nuzzo, Ralph G., Journal of the American Chemical Society, 124(45), pp. 13583-13596 (2002).
"Formation of Patterned Microstructures of Conducting Polymers by Soft Lithography and Applications in Microelectronic Device Fabrication," Beh, Weng Sing, et. al. Advanced Materials, 11(12), pp. 1038-1041 (1999).
"Prototyping of Masks, Masters, and Stamps/Mold for Soft Lithography Using an Office Printer and Photographic Reduction," Analytical Chemistry, 72(14), pp. 3176-3180 (2000).

* cited by examiner

*Primary Examiner*—Randy Gulakowski
*Assistant Examiner*—Olatunde S Ojurongbe
(74) *Attorney, Agent, or Firm*—Timothy J. Troy

(57) ABSTRACT

The present invention relates to silicone compositions that can be used to control the interface at which release occurs when a bi-layer or multi-layer structure comprising compositions as separate layers, and a pattern of a different material sandwiched in between, is separated. The present invention further relates to a process that utilizes these compositions to control the transfer or release of patterns deposited on a substrate.

4 Claims, 3 Drawing Sheets

SILICONE COMPOSITIONS AND THEIR USE IN CONTROLLING THE RELEASE OR TRANSFER OF PRINTED OR MOLDED PATTERNS AND TRANSFERRING PROCESSES THEREFORE

CROSS REFERENCE TO RELATED APPLICATIONS

This application is a U.S. national stage filing under 35 U.S.C. §371 of PCT Application No. PCT/US2004/035251 filed on Oct. 22, 2004, currently pending, which claims the benefit of U.S. Provisional Patent Application No. 60/531,759 filed Dec. 22, 2003 under 35 U.S.C. §119(e). PCT Application No. PCT/US2004/035251 and U.S. Provisional Patent Application No. 60/531,759 are hereby incorporated by reference.

DESCRIPTION

The present invention relates to silicone compositions that can be used to control the interface at which release occurs when a bi-layer or multi-layer structure comprising compositions as separate layers, and a pattern of a different material sandwiched in between, is separated. The present invention further relates to a process that utilizes these compositions to control the transfer or release of patterns deposited on a substrate.

In many patterning processes controlled release at a specific interface is desired so that the type and location of the patterns produced in or on the substrate can be controlled. Examples of application include most soft lithography processes to fabricate microfluidic devices, where upon curing, a polydimethylsiloxane has to release at a pre-determined interface so the shape, size, and location of the micro channels can be controlled.

The Decal Transfer Microprinting method was disclosed by William R Childs and Ralph G. Nuzzo in an article entitled "Decal transfer microlithography: A new soft-lithographic patterning method" in the *Journal of the American Chemical Society*, 124(45), pp. 13583-13596 (2002). In that article, Childs and Nuzzo disclose a polydimethylsiloxane pattern formed on a backing layer, and the pattern was eventually transferred to a substrate permanently by engineered adhesion and release. Such adhesion and release was achieved by heat and/or ultraviolet ozone treatment. The nature of ultraviolet ozone treatment is such that environmental exposure conditions are important variables in this process. The essential feature of this process is the controlled release at a specific interface. It is desirable to have a system that does not need heat or ultraviolet ozone treatment to engineer release at a specified interface.

Capillary micro contact printing used to pattern a conductive polymer polyaniline was disclosed by Weng Sing Beh, In Tae Kim, Dong Qin, Younan Xia, and George M. Whitesides in an article entitled "Formation of patterned microstructures of conducting polymers by soft lithography and applications in microelectronic device fabrication", *Advanced Materials*, 11(12), pp. 1038-1041 (1999). This article discloses a relief pattern formed on a polydimethylsiloxane surface by molding over a master and the polydimethylsiloxane was placed on a substrate to form a channel network. When a polyaniline emeraldine base in NMP was placed at the open end of the channels the solution was drawn into the channels by capillary force. Upon solvent evaporation, drying, and removal of the polydimethylsiloxane mold, the polyaniline emeraldine was converted to a conductive polyaniline emeraldine salt by doping with HCl. In this process the given nature of polydimethylsiloxane to release from the polyaniline surface and the substrate surface makes fabricating the circuit on the substrate possible. Processes such as this, however, do not have the freedom to easily switch between release at the interface of polydimethylsiloxane and polyaniline, and release at the interface between the polyaniline and the substrate.

Deng et al. discloses a release process in an article entitled "Prototyping of masks, masters, and stamps/molds for soft lithography using an office printer and photographic reduction", *Analytical Chemistry*, 72(14), pp. 3176-3180 (2000). The process disclosed uses a low cost, office laser printer in combination with CAD software to print a pattern onto paper. Photo reduction of the pattern by imaging it onto a 35 mm film or microfiche was used to obtain a master to mold polydimethylsiloxane. The polydimethylsiloxane releases from the film and from the developed image, replicating the patterns, and was used as stamps and molds for soft lithography processes.

Bottari in U.S. Pat. No. 6,280,552 discloses the use of controlled release of printed edge electrodes to a touch screen panel. In this process the electrode was printed onto decal paper and covered with an over coat. The decal paper was removed and the electrode was transferred to the touch screen.

In all these processes, release occurs at one specific interface pre-determined by the material composition. Some of the release mechanisms have to be triggered by exposure to heat or ultraviolet light, some of them rely on the different surface properties of drastically different materials. The reverse of these processes, for example, releasing from a polyaniline/substrate interface to provide an embedded conductive pathway in the molding polymers on top of the substrate, instead of releasing from a polydimethylsiloxane/polyaniline interface to deposit it on the surface of the substrate, would require drastic change in materials, and thus change in other properties.

Consequently there is a need for better, more convenient, and reversible control of release or transfer of patterns placed between a substrate and a polymer molded on top of the substrate when the molded polymer and substrate are separated. It is desired that such control can be achieved with minimum change of mechanical, optical, electrical, and other properties of the substrate and molding polymers.

This invention relates to silicone compositions and a process to control the transfer of a printed or molded pattern. When a pattern of a third material is generated and placed in between such cured silicone compositions, interfacial release will occur only on the interface between the pattern and one composition of the pair when the pair is separated. This allows a clean control of whether the surface feature of a pattern will be replicated with high fidelity, or the pattern will be cleanly transferred from the surface of one composition to the other. Those familiar with the electronics, microfluidics, and optic device fabrication processes will appreciate the utility of such a process, enabled by the compositions, to build economically functional electrical and optical circuits, embedded three dimensional structures, two and three dimensional channel networks, and so on. The compositions are predominantly silicone based, and especially so when the variations of other properties need to be minimized. But organic polymers can also be included in them.

Thus this invention relates to a silicone coating composition comprising:

(I) a first coating layer comprising a silicone composition (X) obtained by a method comprising reacting:
  (A) 100 parts by weight of at least one organosiloxane compound containing an average of greater than two alkenyl groups per molecule and having less than 1.5 mol % of silicon-bonded hydroxy groups wherein the organosiloxane compound is selected from
    (i) an organosiloxane compound comprising $R^2_3SiO_{1/2}$ units and $SiO_{4/2}$ units, wherein the molar ratio of $R^2_3SiO_{1/2}$ units to $SiO_{4/2}$ units is from 0.05 to 4.0,
    (ii) an organosiloxane compound comprising $R^2_3SiO_{1/2}$ units and $R^1SiO_{3/2}$ units, wherein the molar ratio of $R^2_3SiO_{1/2}$ units to $R^1SiO_{3/2}$ units is from 0.05 to 3.0,
    (iii) an organosiloxane compound comprising $R^2_3SiO_{1/2}$ units, $R^1SiO_{3/2}$ units, and $SiO_{4/2}$ units, wherein the molar ratio of $R^2_3SiO_{1/2}$ units to $R^1SiO_{3/2}$ units is from 0.05 to 3.0, and the molar ratio of $R^2_3SiO_{1/2}$ and $R^1SiO_{3/2}$ units combined to $SiO_{4/2}$ units is from 4 to 99,
    (iv) an organosiloxane compound comprising $R^2_3SiO_{1/2}$ units, $R^1SiO_{3/2}$ units, and $R^2_2SiO_{2/2}$ units, wherein the molar ratio of $R^2_3SiO_{1/2}$ units to $R^1SiO_{3/2}$ units and from 0.05 to 3.0, and the molar ratio of $R^2_3SiO_{1/2}$ units and $R^1SiO_{3/2}$ units combined to $R^2_2SiO_{2/2}$ units is from 0.5 to 99,
    (v) an organosiloxane compound comprising $R^2_2SiO_{2/2}$ units and $R^1SiO_{3/2}$ units, wherein the molar ratio of $R^2_2SiO_{2/2}$ units to $R^1SiO_{3/2}$ units is from 0.2 to 4.0,
    (vi) an organosiloxane compound comprising $R^2_2SiO_{2/2}$ units and $R^2_3SiO_{1/2}$ units, wherein the molar ratio of $R^2_2SiO_{2/2}$ units to $R^2_3SiO_{1/2}$ units is from 0 to 15,000, and
    (vii) an organosiloxane compound comprising $R^2_2SiO_{2/2}$ units, $R^2_3SiO_{1/2}$ units, and $SiO_{4/2}$ units, wherein the molar ratio of $SiO_{2/2}$ units to $R^2_2SiO_{2/2}$ units and $R^2_3SiO_{1/2}$ units combined is from 0.005 to 0.125 wherein $R^1$ is a hydrocarbon group free of aliphatic unsaturation and $R^2$ is selected from $R^1$ and alkenyl groups;
  (B) at least one organohydrogensilicon compound in an amount sufficient to crosslink (A) selected from
    (i) an organohydrogensilane compound having the formula $HR^3_2SiR^4SiR^3_2H$ wherein $R^3$ is a hydrocarbon group free of aliphatic unsaturation and $R^4$ is a divalent hydrocarbon group and
    (ii) an organohydrogensiloxane compound having the formula $(HR^3_aSiO_{(3-a)/2})_b(R^1_cSiO_{(4-c)/2})_d$ wherein $R^1$ and $R^3$ are as defined above, $1 \leq a \leq 2$, $0 \leq c \leq 3$, the value of b+d provides a molecular weight of 134 to 75,000, and with the proviso that there are at least two SiH groups per molecule;
  (C) a catalytic amount of a hydrosilylation catalyst; and optionally (D) an inorganic filler; and
(II) a second coating layer in contact with the coating layer (I), the second coating layer comprising a silicone composition (Y) obtained by a method comprising reacting:
  (A') 100 parts by weight of at least one organosiloxane compound containing an average of greater than two alkenyl groups per molecule and having less than 1.5 mol % of silicon-bonded hydroxy groups, wherein the organosiloxane compound is selected from
    (i) an organosiloxane compound comprising $R^2_2SiO_{2/2}$ units and $R^2_3SiO_{1/2}$ units, wherein the molar ratio of $R^2_2SiO_{2/2}$ units and $R^2_3SiO_{1/2}$ units is from 0 to 15,000 and
    (ii) an organosiloxane compound comprising $R^2_3SiO_{1/2}$ units and $SiO_{4/2}$ units, wherein the molar ratio of $R^2_3SiO_{1/2}$ units to $SiO_{4/2}$ units is from 0.05 to 4.0 wherein $R^2$ is selected from hydrocarbon groups free of aliphatic unsaturation and alkenyl groups;
  (B') at least one organohydrogensilicon compound in an amount sufficient to crosslink (A') selected from
    (i) an organohydrogensilane compound having the formula $HR^3_2SiR^4SiR^3_2H$ and
    (ii) an organohydrogensiloxane compound having the formula
    $(HR^3_aSiO_{(3-a)/2})_b(R^1_cSiO_{(4-c)/2})_d$
    wherein $R^1$ and $R^3$ are each independently a hydrocarbon group free of aliphatic unsaturation, $R^4$ is a divalent hydrocarbon group, $1 \leq a \leq 2$, $0 \leq c \leq 3$, the value of b+d provides a molecular weight of 134 to 75,000, and with the proviso that there are at least two SiH groups per molecule;
  (C') a catalytic amount of a hydrosilylation catalyst; and optionally (D') an inorganic filler with the proviso that the molar ratio of $R^2_2SiO_{2/2}$ units to all other units combined is higher in composition (Y) than in composition (X), and the surface energy of composition (Y) is lower than composition (X).

"Reacting" as used herein means mixing components (A)-(C) and (A')-(C'), respectively, and any optional components at room temperature (20-25° C.) or heating a mixture comprising components (A')-(C'), and any optional components to temperatures above room temperature such as at temperatures of up to 200° C. Compositions (X) and (Y) may be prepared by mixing (or mechanically agitating) components (A)-(C) and (A')-(C'), respectively, and any optional components, to form a homogenous mixture. This may be accomplished by any convenient mixing method known in the art exemplified by a spatula, mechanical stirrers, in-line mixing systems containing baffles and/or blades, powered in-line mixers, homogenizers, a drum roller, a three-roll mill, a sigma blade mixer, a bread dough mixer, and a two roll mill. The order of mixing is not considered critical. Components (A)-(C) and (A')-(C') and any optional components, may be pre-mixed and applied or mixed during application if tack free time is short.

In compositions (X) and (Y) above, the hydrocarbon groups free of aliphatic unsaturation are illustrated by alkyl groups such as methyl, ethyl, propyl, butyl, pentyl, hexyl, octyl, decyl, dodecyl, and aryl groups such as phenyl, naphthyl, benzyl, tolyl, xylyl, xenyl, methylphenyl, 2-phenylethyl, 2-phenyl-2-methylethyl, chlorophenyl, bromophenyl and fluorophenyl. The hydrocarbon group free of aliphatic unsaturation is typically methyl. The alkenyl groups in compositions (X) and (Y) above are illustrated by vinyl, allyl, butenyl, pentenyl, hexenyl, and decenyl. The alkenyl group is typically vinyl. The divalent hydrocarbon groups in compositions (X) and (Y) above are illustrated by alkylene groups selected from $-(CH_2)_x-$ where x has a value of 2 to 10, $-CH_2CH(CH_3)-$, $-CH_2CH(CH_3)CH_2-$, and $-CH_2CH_2CH(CH_2CH_3)CH_2CH_2CH_2-$.

Component (A) is typically illustrated by an organosiloxane compound comprising $ViMe_2SiO_{1/2}$ units and $PhSiO_{3/2}$ units, where the molar ratio of $ViMe_2SiO_{1/2}$ units to $PhSiO_{3/2}$ is from 0.05 to 3.0. Component (A) is illustrated by an organosiloxane having the formula $(ViMe_2SiO_{1/2})_{25}(PhSiO_{3/2})_{75}$.

Component (B) is typically illustrated by an organohydrogensilane compound having the formula $HMe_2Si-Ph-SiMe_2H$.

Component (A') is typically illustrated by an organosiloxane comprising $(ViMe_2SiO_{1/2})$ units, $(Me_3SiO_{1/2})$ units, ($Me_2SiO_{2/2}$) units, and ($SiO_2$) units wherein the ratio of ($ViMe_2SiO_{1/2}$) units+($Me_3SiO_{1/2}$) units to ($Me_2SiO_{2/2}$) units, is from 1/10000 to 1/5 and the ratio of ($Me_2SiO_{2/2}$) units to ($SiO_2$) units is from 200/1 to 1/4. Component (A') is illustrated by an organosiloxane compound having the formula ($ViMe_2SiO_{1/2}$)$_2$($Me_3SiO_{1/2}$)$_{15}$($Me_2SiO_{2/2}$)$_{81}$($SiO_2$)$_{22}$.

Component (B') is typically illustrated by an organohydrogensiloxane compound having the formula $Me_3SiO(Me_2SiO)_x(MeHSiO)_ySiMe_3$ wherein the value of x+y provides a molecular weight of 134 to 75,000 and there are at least two SiH groups per molecule. Component (B') is illustrated by an organosiloxane compound having the formula $Me_3SiO(Me_2SiO)_3(MeHSiO)_5SiMe_3$.

Components (C) and (C'), the hydrosilylation catalysts are illustrated by any metal-containing catalyst which facilitates the reaction of silicon-bonded hydrogen atoms of components (B) and (B'), respectively, with the silicon-bonded alkenyl groups of components (A) and (A'), respectively. The metals are illustrated by ruthenium, rhodium, palladium, osmium, iridium, or platinum.

The metal-containing catalyst is typically a platinum-containing catalyst since they are the most widely used and available and because they provide a more favorable effect for the compositions of this invention in terms of improved reaction rates. Platinum-containing catalysts can be a compound or complex of a platinum metal.

One type of typical platinum-containing catalyst in the compositions of this invention is the composition that is obtained when chloroplatinic acid is reacted with an aliphatically unsaturated organosilicon compound such as divinyltetramethyldisiloxane, because of its easy dispersibility in organosilicon systems.

Preferably components (C) and (C') are selected from chloroplatinic acid, alcohol modified chloroplatinic acids, olefin complexes of chloroplatinic acid, complexes of chloroplatinic acid and divinyltetramethyldisiloxane, fine platinum particles adsorbed on carbon carriers, platinum supported on metal oxide carriers such as $Pt(Al_2O_3)$, platinum black, platinum acetylacetonate, platinum(divinyltetramethyldisiloxane), platinous halides exemplified by $PtCl_2$ and $PtCl_4$, $Pt(CN)_2$, complexes of platinous halides with unsaturated compounds exemplified by ethylene, propylene, and organovinylsiloxanes, styrene hexamethyldiplatinum, and $RhCl_3(Bu_2S)_3$.

The amount of hydrosilylation catalyst that is used is not narrowly limited as long as there is a sufficient amount to accelerate a reaction between Components (A) and (B), and between Components (A') and (B'), at room temperature or at temperatures above room temperature. The exact necessary amount of this catalyst will depend on the particular catalyst utilized and is not easily predictable. However, for platinum-containing catalysts the amount can be as low as one weight part of platinum for every one million weight parts of components (A)+(B) or components (A')+(B'). The catalyst can be added at an amount 10 to 120 weight parts per one million parts of components (A)+(B) or (A')+(B'), but is typically added in an amount from 10 to 60 weight parts per one million parts of components (A)+(B) or, components (A')+(B').

Component (D) and (D'), the inorganic filler, is an optional component which may be added to Compositions (X) and/or (Y). The inorganic filler is illustrated by hollow microsperes, fumed silica, precipitated silica, silicic anhydride, hydrous silicic acid, carbon black, ground quartz, calcium carbonate, magnesium carbonate, diatomaceous earth, wollastonite, calcined clay, clay, talc, kaolin, titanium oxide, bentonite, ferric oxide, zinc oxide, glass balloon, glass beads, mica, glass powder, glass balloons, coal dust, acrylic resin powder, phenolic resin powder, ceramic powder, zeolite, slate powder, organic fibers, and inorganic fibers. The amount of inorganic filler is typically in an amount from 5 to 30 per 100 parts of component (A).

This invention also relates to a method of making an article of manufacture comprising the steps of: (I) applying silicone composition (Y) to a substrate to form a coating 1 to 500 micrometer thick; (II) curing the silicone composition of step (I); (III) forming a pattern on top of the product of step (II); (IV) applying silicone composition (X) over the pattern of step (III); (V) curing silicone composition (X) with the proviso that the molar ratio of $R^2_2SiO_{2/2}$ units to all other units combined is higher in silicone composition (Y) than in the silicone composition (X), and the surface energy of the cured composition (Y) is lower than the cured silicone composition (X); and (VI) separating the cured silicone composition (X) of step (V) from the substrate.

Upon separation the pattern will be transferred and embedded into the cured composition (X). The separation between the two silicone compositions, and between the silicone composition (Y) and the pattern of step (III), is clean.

In the above method, compositions (X) and (Y) are as described above. Curing of the silicone compositions in the above method is typically accomplished by exposing the composition to temperatures ranging from 25 to 150° C., and more typically from 60 to 100° C. The method of applying the silicone composition is not critical to the present invention and can be any of those known in the art for applying liquid coatings to substrates. The silicone composition in the above method can be applied by such methods as dipping, spraying, wiping, brushing, extrusion, and coextrusion. The substrate to which the silicone composition is applied can be any solid substrate such as glass, metal, or plastic.

When the surface profile of the pattern needs to be replicated and minimum or no transfer of the pattern into the molding layer is desired, the process can be reversed. In this case the silicone composition (X) is used as the coating, and the silicone composition (Y) will be the molding composition used on top of the coating. Thus this invention also relates to a method of making an article of manufacture comprising the steps of:

(I) applying a silicone composition (X) to a substrate to form a coating 1 to 500 micrometer thick wherein silicone composition (X) is obtained by a method comprising reacting:
(A) 100 parts by weight of at least one organosiloxane compound containing an average of greater than two alkenyl groups per molecule and having less than 1.5 mol % of silicon-bonded hydroxy groups wherein the organosiloxane compound is selected from
(i) an organosiloxane compound comprising $R^2_3SiO_{1/2}$ units and $SiO_{4/2}$ units, wherein the molar ratio of $R^2_3SiO_{1/2}$ units to $SiO_{4/2}$ units is from 0.05 to 4.0,
(ii) an organosiloxane compound comprising $R^2_3SiO_{1/2}$ units and $R^1SiO_{3/2}$ units, wherein the molar ratio of $R^2_3SiO_{1/2}$ units to $R^1SiO_{3/2}$ units is from 0.05 to 3.0,
(iii) an organosiloxane compound comprising $R^2_3SiO_{1/2}$ units, $R^1SiO_{3/2}$ units, and $SiO_{4/2}$ units, wherein the molar ratio of $R^2_3SiO_{1/2}$ units to $R^1SiO_{3/2}$ units is from 0.05 to 3.0, and the molar ratio of $R^2_3SiO_{1/2}$ and $R^1SiO_{3/2}$ units combined to $SiO_{4/2}$ units is from 4 to 99,
(iv) an organosiloxane compound comprising $R^2_3SiO_{1/2}$ units, $R^1SiO_{3/2}$ units, and $R^2_2SiO_{2/2}$ units, wherein the molar ratio of $R^2_3SiO_{1/2}$ units to $R^1SiO_{3/2}$ units is from 0.05 to 3.0, and the molar ratio of $R^2_3SiO_{1/2}$ units and $R^1SiO_{3/2}$ units combined to $R^2_2SiO_{2/2}$ units is from 0.5 to 99, (v) an organosiloxane compound comprising $R^2_2SiO_{2/2}$ units and $R^1SiO_{3/2}$ units, wherein the molar ratio of $R^2_2SiO_{2/2}$ units to $R^1SiO_{3/2}$ units is from 0.2 to 4.0, (vi) an organosiloxane compound comprising $R^2_2SiO_{2/2}$ units and $R^2_3SiO_{1/2}$ units, wherein the molar ratio of $R^2_2SiO_{2/2}$ units to $R^2_3SiO_{1/2}$ units is from 0 to 15,000, and (vii) an organosiloxane compound comprising $R^2_2SiO_{2/2}$ units, $R^2_3SiO_{1/2}$ units, and $SiO_{4/2}$ units, wherein the molar ratio of $SiO_{2/2}$ units to $R^2_2SiO_{2/2}$ units and $R^2_3SiO_{1/2}$ units combined is from 0.005 to 0.125 wherein $R^1$ is a hydrocarbon group free of aliphatic unsaturation and $R^2$ is selected from $R^1$ and alkenyl groups;

(B) at least one organohydrogensilicon compound in an amount sufficient to crosslink (A) selected from
  (i) an organohydrogensilane compound having the formula $HR^3_2SiR^4SiR^3_2H$ wherein $R^3$ is a hydrocarbon group free of aliphatic unsaturation and $R^4$ is a divalent hydrocarbon group and
  (ii) an organohydrogensiloxane compound having the formula $(HR^3_aSiO_{(3-a)/2})_b(R^1_cSiO_{(4-c)/2})_d$ wherein $R^1$ and $R^3$ are as defined above, $1 \leq a \leq 2$, $0 \leq c \leq 3$, the value of b+d provides a molecular weight of 134 to 75,000, and with the proviso that there are at least two SiH groups per molecule;

(C) a catalytic amount of a hydrosilylation catalyst; and optionally (D) an inorganic filler (II) curing silicone composition (X);

(III) forming a pattern on top of the product of step (II);

(IV) applying a silicone composition (Y) over the pattern of step (III) wherein silicone composition (Y) is obtained by a method comprising reacting:

(A') 100 parts by weight of at least one organosiloxane compound containing an average of greater than two alkenyl groups per molecule and having less than 1.5 mol % of silicon-bonded hydroxy groups, wherein the organosiloxane compound is selected from
  (i) an organosiloxane compound comprising $R^2_2SiO_{2/2}$ units and $R^2_3SiO_{1/2}$ units, wherein the molar ratio of $R^2_2SiO_{2/2}$ units and $R^2_3SiO_{1/2}$ units is from 0 to 15,000 and
  (ii) an organosiloxane compound comprising $R^2_3SiO_{1/2}$ units and $SiO_{4/2}$ units, wherein the molar ratio of $R^2_3SiO_{1/2}$ units to $SiO_{4/2}$ units is from 0.05 to 4.0 wherein $R^2$ is selected from hydrocarbon groups free of aliphatic unsaturation and alkenyl groups;

(B') at least one organohydrogensilicon compound in an amount sufficient to crosslink (A') selected from
  (i) an organohydrogensilane compound having the formula $HR^3_2SiR^4SiR^3_2H$ and
  (ii) an organohydrogensiloxane compound having the formula $$(HR^3_aSiO_{(3-a)/2})_b(R^1_cSiO_{(4-c)/2})_d$$

wherein $R^1$ and $R^3$ are each independently a hydrocarbon group free of aliphatic unsaturation, $R^4$ is a divalent hydrocarbon group, $1 \leq a \leq 2$, $0 \leq c \leq 3$, the value of b+d provides a molecular weight of 134 to 75,000, and with the proviso that there are at least two SiH groups per molecule;

(C') a catalytic amount of a hydrosilylation catalyst; and optionally (D') an inorganic filler;

(V) curing silicone composition (Y) with the proviso that the molar ratio of $R^2_2SiO_{2/2}$ units to all other units combined is higher in silicone composition (X) than in the silicone composition (Y), and the surface energy of the cured composition (X) is lower than the cured silicone composition (Y); and (VI) separating the cured silicone composition (Y) of step (V) from the substrate.

The ability to reverse the process derives from the minimized composition differences between the two silicone compositions, and the wide range of mechanical properties attainable with these compositions. For most compositions, the only requirement for them to function properly is the higher $R^2_2SiO_{2/2}$ units in one composition versus the other so that the surface energy of one of the cured compositions is lower than the other.

The process can also be repeated as follows to build three-dimensional embedded structures. Thus this invention also relates to a method of making an article of manufacture comprising the steps of: (I) applying silicone composition (Y) to a substrate to form a coating 1 to 500 micrometer thick; (II) curing the silicone composition of step (I); (III) forming a pattern on top of the product of step (II); (IV) placing a layer with pattern embedded in on top of the layer, in alignment with but not in contact with the substrate;

(V) applying silicone composition (X) onto the surface of the substrate or onto the surface of the layer through capillary flow; (VI) curing silicone composition (X); and (VII) separating the cured silicone composition (X) of step (VI) from the substrate. Silicone compositions (X) and (Y), the curing of the silicone compositions, the method of applying the silicone compositions, and the substrate are all as defined above.

DRAWINGS

EXAMPLES

A VCA 2500 goniometer was used to measure water contact angle and surface energies. Water and methylene iodide contact angles were measured by dropping three drops of each liquid on the samples and measuring the tangent angle to the coating. The averages and standard deviations were obtained. The dispersive and polar surface energies were calculated through a geometric mean model.

Example 1

A PET transparent film was coated by silicone composition (hereinafter denoted Silicone Composition A) containing 24 parts by weight of an organosiloxane compound comprising $Me_3SiO_{1/2}$ units, $ViMe_2SiO_{1/2}$ units, and $SiO_2$ units, where Vi denotes vinyl and Me denotes methyl, in a molar ratio of about 0.07 moles of $Me_3SiO_{1/2}$ +$ViMe_2SiO_{1/2}$ units per mole of $SiO_2$ units and where the organosiloxane compound contains from 1.75 to 2.3 weight percent of vinyl and 76 parts by weight of a liquid silicone rubber composition containing a mixture of 88 parts by weight of an organosiloxane compound comprising $(ViMe_2SiO_{1/2})_2$ $(Me_3SiO_{1/2})_{15}$ $(Me_2SiO_{2/2})_{81}$ $(SiO_2)_{22}$ units and 6 parts by weight of an organohydrogensiloxane compound having the formula $Me_3SiO(Me_2SiO)_3(MeHSiO)_5SiMe_3$. The coating was applied by hand operated roll coater with a blade. The pressure applied on the blade controlled the thickness of the coating and the pressure was adjusted so that a 2 micrometer thick coating was obtained. The coating was cured at 125° C. for two hours and cooled to room temperature before use. This coating altered the surface energy of the PET film from 29.2 to 14.0 dyne/cm, as seen in Table 1.

Figure 1:
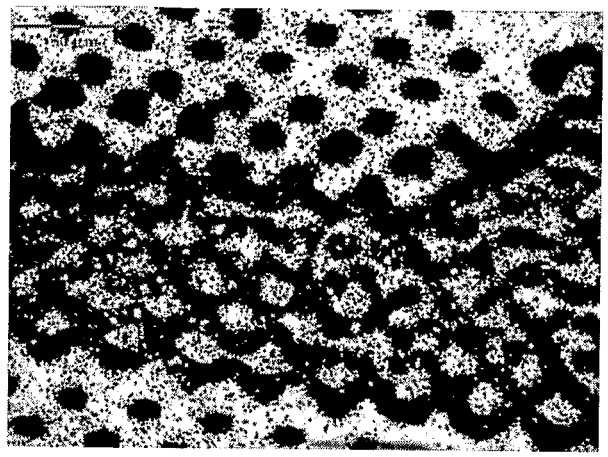
FIG. 1 is an optical microscope image of a carbon black ink pattern printed on the PET film coated with the mixture specified in Example 1.

A carbon black ink dot pattern was printed onto the coated PET film by a laser printer, as shown in FIG. 1, an optical microscope image of the pattern on the coated PET film. In the image the dots were approximately 20 micrometers in diameter. Teflon bars one inch tall were glued onto four sides around the printed pattern by a silicone sealant to form a mold with the top open to the air. The mold was left at room temperature and heated at 80° C. overnight to cure the silicone sealant.

A silicone composition (hereinafter denoted Silicone Composition B) was prepared by mixing an organosiloxane compound comprising the units $(PhSiO_{3/2})_{0.75}$ and $(ViMe_2SiO_{1/2})_{0.25}$ with an organosiloxane compound having the formula $HMe_2Si-Ph-SiMe_2H$ so the SiH/SiVi ratio was 1.1/1. To this mixture was then added a catalyst containing a platinum-(1-ethynyl cyclohenxan-1-ol)-tetramethyl divinyl disiloxane complex dissolved in toluene at a platinum concentration of 1000 ppm. The catalyst was added at a weight ratio of 0.5 parts of catalyst per 100 parts of the above mixture. The Silicone Composition B was then poured onto the top of the printed pattern encircled by Teflon bars, and left at room temperature overnight to cure. The mold with Silicone Composition B coated thereon was then heated at 60° C. for 2 hours to complete the cure. The cured silicone composition had a surface energy of 22 dynes/cm.

Figure 2:
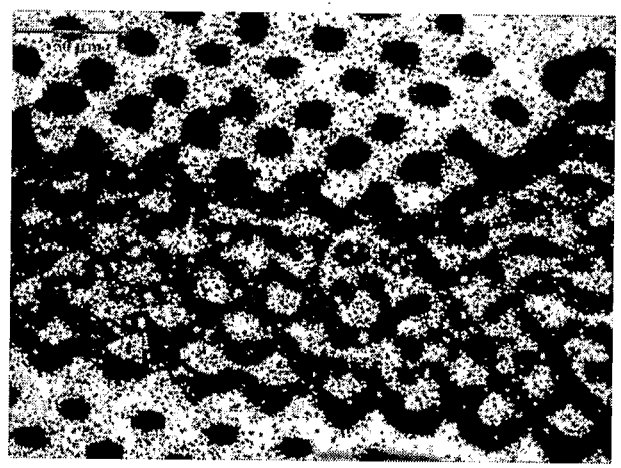
FIG. 2 is an optical microscope image of the printed pattern, shown in FIG. 1, embedded into cured Silicone Composition B.

After cure, the mold was cooled to room temperature and the plaque containing cured Silicone Composition B as a top layer and Silicone Composition A as a bottom layer was peeled off from the mold. As seen in FIG. 2, the printed pattern cleanly transferred to the silicone plaque from the surface of the coated PET film.

Example 2

Example 1 was repeated except that the coating thickness of Composition A on the PET film was increased from 2 micrometers to approximately 20 micrometers. As seen the surface energy was altered from 29.2 to 15.5 dynes/cm, by this thicker coating. The same subsequent procedures as described in Example 1 were followed and a clean transfer of the printed pattern was also observed.

Comparison Example 1

Figure 3:
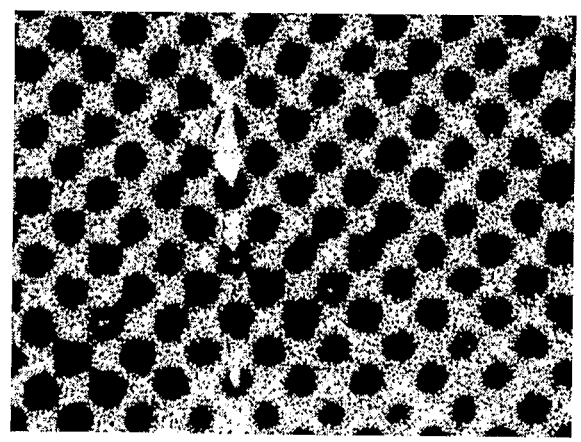
FIG. 3 is an SEM image of a carbon black ink pattern printed on the PET film, size of the dots approximately 5 μm in diameter.
Figure 4:
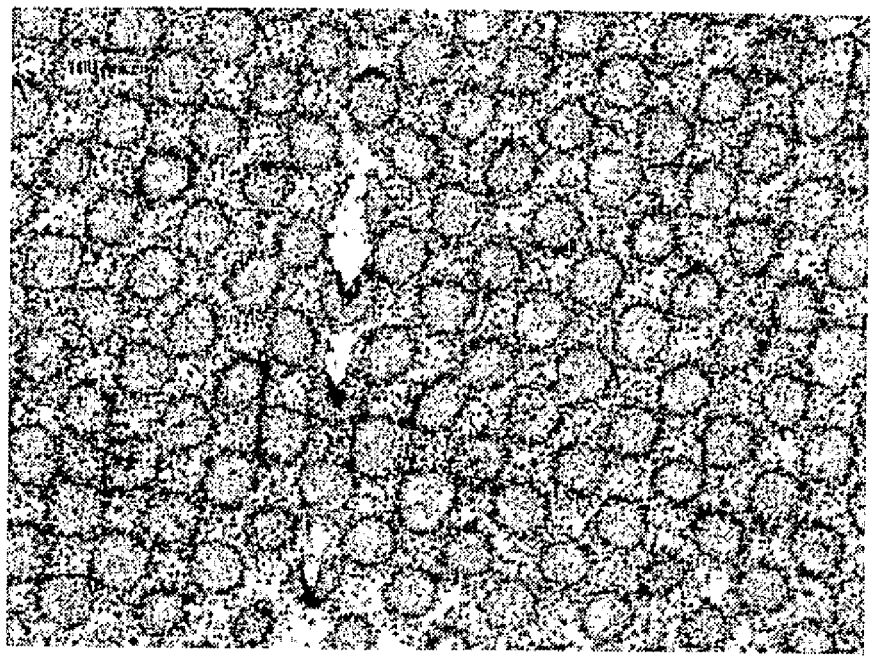
FIG. 4 is an SEM image of the surface of the cured Silicone Composition A after separation from the printed pattern, at the exact location as in FIG. 3.

On an un-coated PET transparent film a carbon black ink dot pattern was printed by a laser printer, as shown in FIG. 3. A mold was made so that the pattern encircled by Teflon bars, similar to the mold used in Example 1, and the mold was cured similarly. Silicone Composition A was poured onto the surface of the pattern in the mold. Silicone Composition A was then cured at 60° C. for 2 hours. Silicone Composition A had a surface energy lower than the PET substrate. After cure the mold was cooled to room temperature and the cured Silicone Composition A was peeled off from the mold. The surface topographic features of the printed pattern were completely and cleanly replicated to the bottom surface of the cured Silicone Composition A. No ink transfer was observed. FIG. 4 is an optical microscope image of the pattern replicated onto the cured Silicone Composition A surface at exactly the same location as in FIG. 3.

Example 3

Procedures and compositions used were the same as in Example 1 except the composition of the coating applied to the PET transparent film. In this example the coating composition was a mixture of 50 parts by weight of a mixture of 47.25 parts by weight of an organosiloxane compound comprising $(ViMe_2SiO_{1/2})_4$ $(Me_3SiO_{1/2})_{39}$ $(SiO_2)_{57}$ units and 3.72 parts by weight of an organosiloxane compound comprising $(ViMe_2SiO_{1/2})_2$ $(Me_2SiO_{2/2})_{740}$ units and 50 parts by weight of an organosiloxane compound comprising $(ViMe_2SiO_{1/2})_2$ $(Me_2SiO_{2/2})_{140}$ units (hereinafter denoted Silicone Composition C). The cured coating altered the surface energy of the PET film from 29.2 to 15.1 dynes/cm. Clean transfer of printed carbon black ink patterns into cured Composition B was also observed with this coating on the PET film.

Example 4

Instead of using the 50/50 mixture described in Example 4 as the coating, 100 parts by weight of the mixture of 47.25 parts by weight of an organosiloxane compound comprising $(ViMe_2SiO_{1/2})_4$ $(Me_3SiO_{1/2})_{39}$ $(SiO_2)_{57}$ units and 3.72 parts by weight of an organosiloxane compound comprising $(ViMe_2SiO_{1/2})_2$ $(Me_2SiO_{2/2})_{740}$ units (Silicone Composition D) was used as the coating on the transparent PET film. As seen in Table 1, the surface energy of the cured coating was 20.4 dynes/cm, much higher than the mixture of Example 4. This coating was not suitable for the purpose of transferring or embedding the printed pattern into Silicone Composition B.

Example 5

Figure 5:
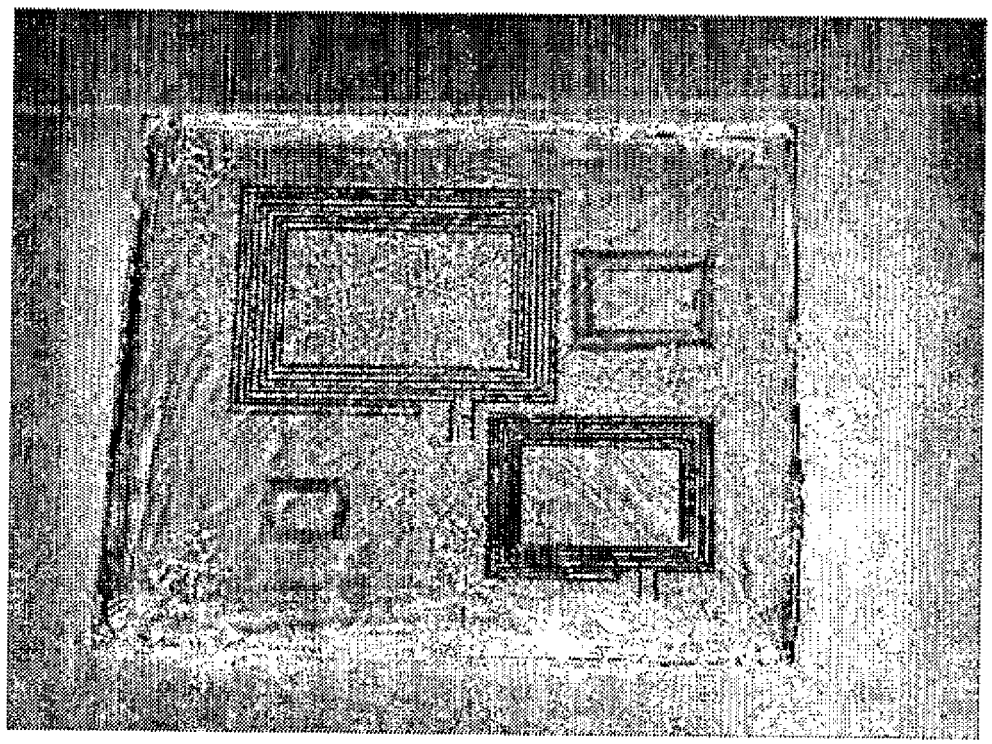
FIG. 5 is an image of the embedded pattern into cured Silicone Composition B.

Composition and procedures were the same as in Example 1. Instead of a carbon black ink dot pattern, carbon black ink patterns identical to a specific design of RFID antenna were printed onto the coated PET film. These patterns were cleanly transferred into cured Silicone Composition B, FIG. 5.

Figure 6:
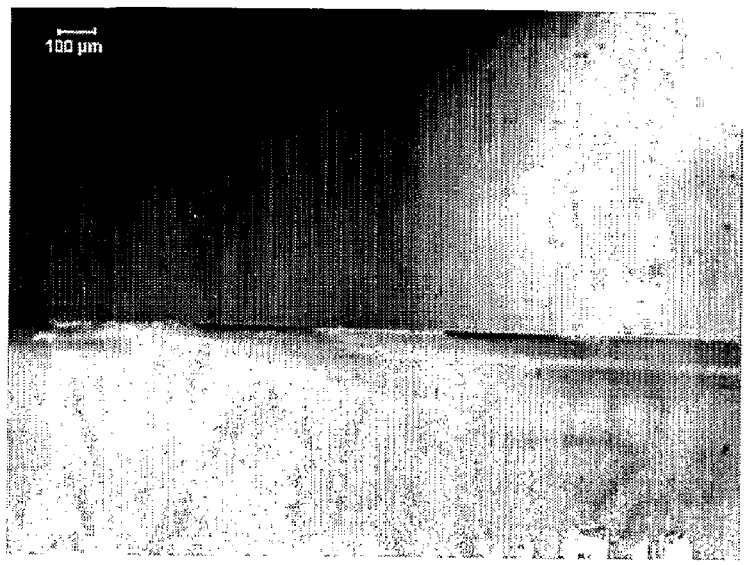
FIG. 6 is an optical microscope image of the cross-section of the embedded pattern in cured Silicone Composition B.
Figure 7:
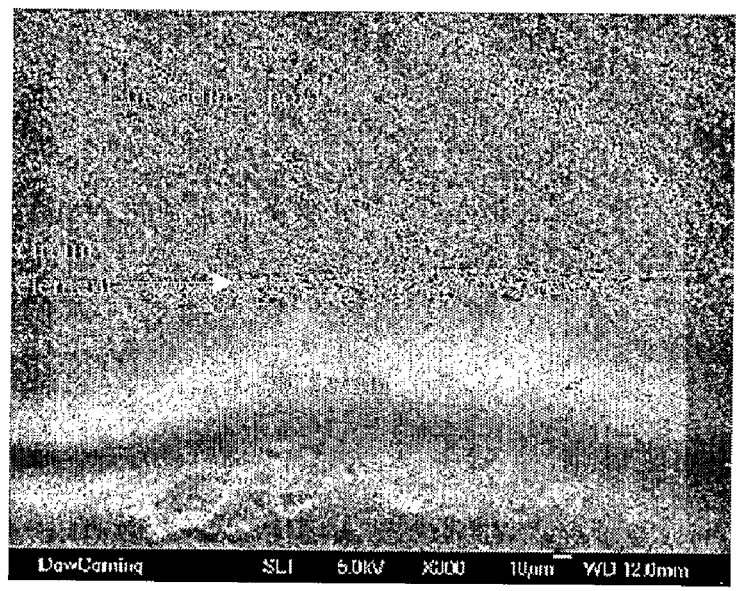
FIG. 7 is an SEM image of the cross-section of the embedded pattern in cured Silicone Composition B.

A close examination of the cross-section of the embedded pattern showed that the pattern was transferred into the silicone composition by controlled release from the interface between the ink pattern and the coated PET. In FIG. 6, an optical microscope image of the cross-section of the embedded pattern, the ink pattern was seen to reside on the surface of Silicone Composition B. This was also confirmed by SEM. Silicone Composition B with the pattern was in turn embedded in an epoxy resin and cured. A cross-section was microtomed and observed under SEM. It again showed the location of the ink patterns was on the surface of the silicone composition as shown in FIG. 7.

TABLE 1

Surface Energy of the PET Substrate With and Without Coatings

| Example | Coating on PET | Dispersive (dynes/cm) | Polar (dynes/cm) | Total (dynes/cm) |
|---|---|---|---|---|
| 1 | Silicone Composition A | 13.7 | 0.3 | 14.0 |
| 2 | Silicone Composition A | 14.9 | 0.6 | 15.5 |
| 3 | Silicone Composition C | 12.6 | 2.5 | 15.1 |
| 4 | Silicone Composition D | 20.2 | 0.2 | 20.4 |
| Comparison Example 1 | None | 27.3 | 1.9 | 29.2 |

The invention claimed is:

1. A silicone coating composition comprising:
(I) a first coating layer comprising a silicone composition (X) obtained by a method comprising reacting:
  (A) 100 parts by weight of at least one organosiloxane compound containing an average of greater than two alkenyl groups per molecule and having less than 1.5 mol % of silicon-bonded hydroxy groups wherein the organosiloxane compound is
    (ii) an organosiloxane compound comprising $R^2_3SiO_{1/2}$ units and $R^1SiO_{3/2}$ units, wherein the molar ratio of $R^2_3SiO_{1/2}$ units to $R^1SiO_{3/2}$ units is from 0.05 to 3.0 or
    (iv) an organosiloxane compound comprising $R^2_3SiO_{1/2}$ units, $R^1SiO_{3/2}$ units, and $R^2_2SiO_{2/2}$ units, wherein the molar ratio of $R^2_3SiO_{1/2}$ units to $R^1SiO_{3/2}$ units is from 0.05 to 3.0, and the molar ratio of $R^2_3SiO_{1/2}$ units and $R^1SiO_{3/2}$ units combined to $R^2_2SiO_{2/2}$ units is from 0.5 to 99;
  (B) at least one organohydrogensilicon compound in an amount sufficient to crosslink (A) wherein $R^1$ is a hydrocarbon group free of aliphatic unsaturation and $R^2$ is selected from $R^1$ and alkenyl groups selected from
    (i) an organohydrogensilane compound having the formula $HR^3_2SiR^4SiR^3_2H$ wherein $R^3$ is a hydrocarbon group free of aliphatic unsaturation and $R^4$ is a divalent hydrocarbon group and
    (ii) an organohydrogensiloxane compound having the formula $(HR^3_aSiO_{(3-a)/2})_b(R^1_cSiO_{(4-c)/2})_d$ wherein $R^1$ and $R^3$ are as defined above, $1 \leq a \leq 2$, $0 \leq c \leq 3$, the value of b+d provides a molecular weight of 134 to 75,000, and with the proviso that there are at least two SiH groups per molecule;
  (C) a catalytic amount of a hydrosilylation catalyst; and optionally (D) an inorganic filler; and
(II) a second coating layer in contact with the coating layer (I), the second coating layer comprising a silicone composition (Y) obtained by a method comprising reacting:
  (A') 100 parts by weight of at least one organosiloxane compound containing an average of greater than two alkenyl groups per molecule and having less than 1.5 mol % of silicon-bonded hydroxy groups, wherein the organosiloxane compound is selected from
    (i) an organosiloxane compound comprising $R^2_2SiO_{2/2}$ units and $R^2_3SiO_{1/2}$ units, wherein the molar ratio of $R^2_2SiO_{2/2}$ units and $R^2_3SiO_{1/2}$ units is from 0 to 15,000 and
    (ii) an organosiloxane compound comprising $R^2_3SiO_{1/2}$ units and $SiO_{4/2}$ units, wherein the molar ratio of $R^2_3SiO_{1/2}$ units to $SiO_{4/2}$ units is from 0.05 to 4.0 wherein $R^2$ is selected from hydrocarbon groups free of aliphatic unsaturation and alkenyl groups;
  (B') at least one organohydrogensilicon compound in an amount sufficient to crosslink (A') selected from
    (i) an organohydrogensilane compound having the formula $HR^3_2SiR^4SiR^3_2H$ and
    (ii) an organohydrogensiloxane compound having the formula
    $(HR^3_aSiO_{(3-a)/2})_b(R^1_cSiO_{(4-c)/2})_d$
    wherein $R^1$ and $R^3$ are each independently a hydrocarbon group free of aliphatic unsaturation, $R^4$ is a divalent hydrocarbon group, $1 \leq a \leq 2$, $0 \leq c \leq 3$, the value of b+d provides a molecular weight of 134 to 75,000, and with the proviso that there are at least two SiH groups per molecule;
  (C') a catalytic amount of a hydrosilylation catalyst; and optionally (D') an inorganic filler
with the proviso that the molar ratio of $R^2_2SiO_{2/2}$ units to all other units combined is higher in composition (Y) than in composition (X), and the surface energy of composition (Y) is lower than Composition (X).

2. A silicone coating composition according to claim 1, wherein the hydrocarbon group free of aliphatic unsaturation is independently selected from methyl and phenyl and the alkenyl group is vinyl.

3. A method of making an article of manufacture comprising the steps of:
(I) applying a silicone composition (Y) to a substrate to form a coating 1 to 500 micrometer thick wherein silicone composition (Y) is obtained by a method comprising reacting:
  (A') 100 parts by weight of at least one organosiloxane compound containing an average of greater than two alkenyl groups per molecule and having less than 1.5 mol % of silicon-bonded hydroxy groups, wherein the organosiloxane compound is selected from
    (i) an organosiloxane compound comprising $R^2_2SiO_{2/2}$ units and $R^2_3SiO_{1/2}$ units, wherein the molar ratio of $R^2_2SiO_{2/2}$ units and $R^2_3SiO_{1/2}$ units is between 0 and 15,000 and
    (ii) an organosiloxane compound comprising $R^2_3SiO_{1/2}$ units and $SiO_{4/2}$ units, wherein the molar ratio of $R^2_3SiO 1/2$ units to $SiO_{4/2}$ units is from 0.05 to 4.0 wherein $R^2$ is selected from hydrocarbon groups free of aliphatic unsaturation and alkenyl groups;
  (B') at least one organohydrogensilicon compound in an amount sufficient to crosslink (A') selected from
    (i) an organohydrogensilane compound having the formula $HR^3_2SiR^4SiR^3_2H$ and
    (ii) an organohydrogensiloxane compound having the formula
    $(HR^3_aSiO_{(3-a)/2})_b(R^1_cSiO_{(4-c)/2})_d$
    wherein $R^1$ and $R^3$ are each independently a hydrocarbon group free of aliphatic unsaturation, $R^4$ is a divalent hydrocarbon group, $1 \leq a \leq 2$, $0 \leq c \leq 3$, the value of b+d provides a molecular weight of 134 to 75,000, and with the proviso that there are at least two SiH groups per molecule;
  (C') a catalytic amount of a hydrosilylation catalyst; and optionally (D') an inorganic filler;
(II) curing silicone composition (Y);
(III) forming a pattern on top of the product of step (II);

(IV) applying a silicone composition (X) over the pattern of step (III) wherein silicone composition (X) is obtained by a method comprising reacting:
(A) 100 parts by weight of at least one organosiloxane compound containing an average of greater than two alkenyl groups per molecule and having less than 1.5 mol % of silicon-bonded hydroxy groups wherein the organosiloxane compound is
  (ii) an organosiloxane compound comprising $R^2_3SiO_{1/2}$ units and $R^1SiO_{3/2}$ units, wherein the molar ratio of $R^2_3SiO_{1/2}$ units to $R^1SiO_{3/2}$ units is from 0.05 to 3.0 or
  (iv) an organosiloxane compound comprising $R^2_3SiO_{1/2}$ units, $R^1SiO_{3/2}$ units, and $R^2_2SiO_{2/2}$ units, wherein the molar ratio of $R^2_3SiO_{1/2}$ units to $R^1SiO_{3/2}$ units is from 0.05 to 3.0, and the molar ratio of $R^2_3SiO_{1/2}$ units and $R^1SiO_{3/2}$ units combined to $R^2_2SiO_{2/2}$ units is from 0.5 to 99;
(B) at least one organohydrogensilicon compound in an amount sufficient to crosslink (A) wherein $R^1$ is a hydrocarbon group free of aliphatic unsaturation and $R^2$ is selected from $R^1$ and alkenyl groups selected from
  (i) an organohydrogensilane compound having the formula $HR^3_2SiR^4SiR^3_2H$ wherein $R^3$ is a hydrocarbon group free of aliphatic unsaturation and $R^4$ is a divalent hydrocarbon group and
  (ii) an organohydrogensiloxane compound having the formula $(HR^3_aSiO_{(3-a)/2})_b(R^1_cSiO_{(4-c)/2})_d$ wherein $R^1$ and $R^3$ are as defined above, $1 \leq a \leq 2$, $0 \leq c \leq 3$, the value of b+d provides a molecular weight of 134 to 75,000, and with the proviso that there are at least two SiH groups per molecule;
(C) a catalytic amount of a hydrosilylation catalyst; and
optionally (D) an inorganic filler;
(V) curing silicone composition (X)
with the proviso that the molar ratio of $R^2_2SiO_{2/2}$ units to all other units combined is higher in silicone composition (Y) than in the silicone composition (X), and the surface energy of the cured composition (Y) is lower than the cured silicone composition (X); and
(VI) separating the cured silicone composition (X) of step (V) from the substrate.

4. A method according to claim 3, wherein the hydrocarbon group free of aliphatic unsaturation is independently selected from methyl and phenyl and the alkenyl group is vinyl.

* * * * *